(12) United States Patent
Panchal et al.

(10) Patent No.: US 6,928,063 B2
(45) Date of Patent: Aug. 9, 2005

(54) METHOD AND APPARATUS FOR PROVIDING A DISPATCH PATCH SERVICE IN A CDMA COMMUNICATION SYSTEM

(75) Inventors: Rajendra A. Panchal, Algonquin, IL (US); Alexander Rozenstrauch, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 875 days.

(21) Appl. No.: 09/811,213

(22) Filed: Mar. 16, 2001

(65) Prior Publication Data

US 2002/0131380 A1 Sep. 19, 2002

(51) Int. Cl.$^7$ .............................................. H04B 7/216
(52) U.S. Cl. ...................... 370/335; 370/342; 455/518
(58) Field of Search ................................. 370/320, 329, 370/335, 342, 441, 479, 312, 260–262, 315, 389, 390, 432; 455/422.1, 450, 426, 1–2, 517–521

(56) References Cited

U.S. PATENT DOCUMENTS

| | | | |
|---|---|---|---|
| 5,056,109 A | 10/1991 | Gilhousen et al. | |
| 5,216,692 A | 6/1993 | Ling | |
| 5,257,183 A | 10/1993 | Tam | |
| 5,265,119 A | 11/1993 | Gilhousen | |
| 5,267,262 A | 11/1993 | Wheatley, III | |
| 5,323,452 A | 6/1994 | Dickman et al. | |
| 5,383,219 A | 1/1995 | Wheatley, III et al. | |
| 5,465,391 A * | 11/1995 | Toyryla ...................... | 455/518 |
| 5,485,486 A | 1/1996 | Gilhousen et al. | |
| 5,548,808 A | 8/1996 | Bruckert et al. | |
| 5,590,177 A | 12/1996 | Vilmur et al. | |
| 5,613,209 A | 3/1997 | Peterson et al. | |
| 5,621,723 A | 4/1997 | Walton, Jr. et al. | |
| 5,691,979 A | 11/1997 | Cadd et al. | |
| 5,711,011 A | 1/1998 | Urs et al. ..................... | 455/520 |
| 5,797,097 A | 8/1998 | Roach, Jr. et al. | |
| 5,835,860 A * | 11/1998 | Diachina ..................... | 455/458 |
| 5,852,781 A | 12/1998 | Ahvenainen | |
| 5,878,038 A | 3/1999 | Willey ........................ | 370/335 |
| 5,881,058 A | 3/1999 | Chen .......................... | 370/335 |
| 5,887,252 A * | 3/1999 | Noneman .................... | 455/463 |
| 5,914,958 A | 6/1999 | Chinitz et al. .............. | 370/441 |
| 5,920,549 A | 7/1999 | Bruckert et al. | |
| 5,960,356 A | 9/1999 | Alperovich et al. | |
| 5,987,012 A | 11/1999 | Bruckert et al. | |
| 6,005,848 A | 12/1999 | Grube et al. ................ | 370/266 |
| 6,058,308 A | 5/2000 | Kallin et al. | |
| 6,115,388 A | 9/2000 | Chinitz et al. | |
| 6,134,450 A * | 10/2000 | Nordeman ................... | 455/517 |
| 6,169,906 B1 | 1/2001 | Bruckert | |
| 6,178,166 B1 | 1/2001 | Wilson et al. .............. | 370/335 |
| 6,188,767 B1 | 2/2001 | Needham et al. | |
| 6,233,461 B1 | 5/2001 | Chinitz et al. | |
| 6,292,671 B1 * | 9/2001 | Mansour ..................... | 455/518 |
| 6,333,921 B1 | 12/2001 | Grube et al. | |
| 6,373,829 B1 * | 4/2002 | Vilmur ....................... | 370/335 |
| 6,542,755 B1 * | 4/2003 | Tsukagoshi ................. | 455/503 |
| 6,662,010 B1 * | 12/2003 | Tseitlin et al. ........... | 455/426.1 |
| 6,801,783 B2 * | 10/2004 | Needham et al. ........... | 455/519 |

FOREIGN PATENT DOCUMENTS

EP     0 828 355 A2    3/1998

* cited by examiner

*Primary Examiner*—Brian Nguyen
*Assistant Examiner*—Tri H. Phan
(74) *Attorney, Agent, or Firm*—Jeffrey K. Jacobs

(57) ABSTRACT

In general, the present invention discloses a method and an apparatus that provide a dispatch patch service in a CDMA communication system (100). A communication unit (103) involved in a dispatch call requests a base site (101) to patch a patch target (105), either a dispatch group or an individual, into the present call. By providing the CDMA long-code mask being used for the present call to the patch target and the dispatch identifier of the patch target to at least the communication unit, a new CDMA long-code mask can be generated and used for the dispatch call going forward.

20 Claims, 3 Drawing Sheets

METHOD AND APPARATUS FOR PROVIDING A DISPATCH PATCH SERVICE IN A CDMA COMMUNICATION SYSTEM

CROSS-REFERENCE TO RELATED APPLICATION

This application is related to a co-pending application, "METHOD AND APPARATUS FOR PROVIDING DISPATCH SERVICE IN A CDMA COMMUNICATION SYSTEM", Ser. No. 09/443,538, filed on Nov. 19, 1999, assigned to the assignee of the present application, which prior application is hereby incorporated by reference verbatim, with the same effect as though the prior application were fully and completely set forth herein. This application is also related to a co-pending application, "METHOD AND APPARATUS FOR PROVIDING DISPATCH SCAN IN A CDMA COMMUNICATION SYSTEM", Ser. No. 09/757,335, filed on Jan. 10, 2001 and assigned to the assignee of the present application.

FIELD OF THE INVENTION

The present invention relates generally to the field of wireless communications and, more particularly, to a dispatch patch service on code division multiple access (CDMA) communication systems.

BACKGROUND OF THE INVENTION

Communication systems today, such as Motorola's "iDEN" system, provide users with so-called dispatch services. Unlike the interconnect services provided by today's cellular systems, dispatch services have been traditionally provided by two-way radio systems. Such services allow a user to communicate in ways that are difficult or costly using today's cellular systems. The dispatch group call service, for example, enables a user to communicate with a group of people simultaneously and instantaneously, usually just by depressing a push-to-talk (PTT) button. Using a cellular system, such a call could not occur instantaneously since either telephone numbers would need to be dialed for a three-way call or arrangements would need to be made to setup a conference call.

Likewise, the dispatch individual call service enables a user to communicate with another user quickly and spontaneously. This feature is ideal for two people who are working together but are unable to speak with one another directly such as two people working in concert but in different parts of a building. Where a wireless telephone call is more appropriate for a conversation, short messages between two people as they work are better facilitated by the dispatch individual call service.

Occasionally however, two or more users already involved in dispatch communication need to include another user in their call. Private radio systems today allow a dispatcher, for example, to patch dispatch groups together. However, today's CDMA systems neither provide dispatch service nor a dispatch patch service that would enable a user involved in a dispatch call to patch another user into the existing call. The co-pending application "METHOD AND APPARATUS FOR PROVIDING DISPATCH SERVICE IN A CDMA COMMUNICATION SYSTEM" discloses modifications to the IS-95 CDMA standard enabling CDMA dispatch service. However, this co-pending application does not disclose a CDMA embodiment that enables the dispatch patch service. Therefore, a need exists for an apparatus and method for providing a dispatch patch service in a CDMA communication system.

DESCRIPTION OF A PREFERRED EMBODIMENT

Figure 1:
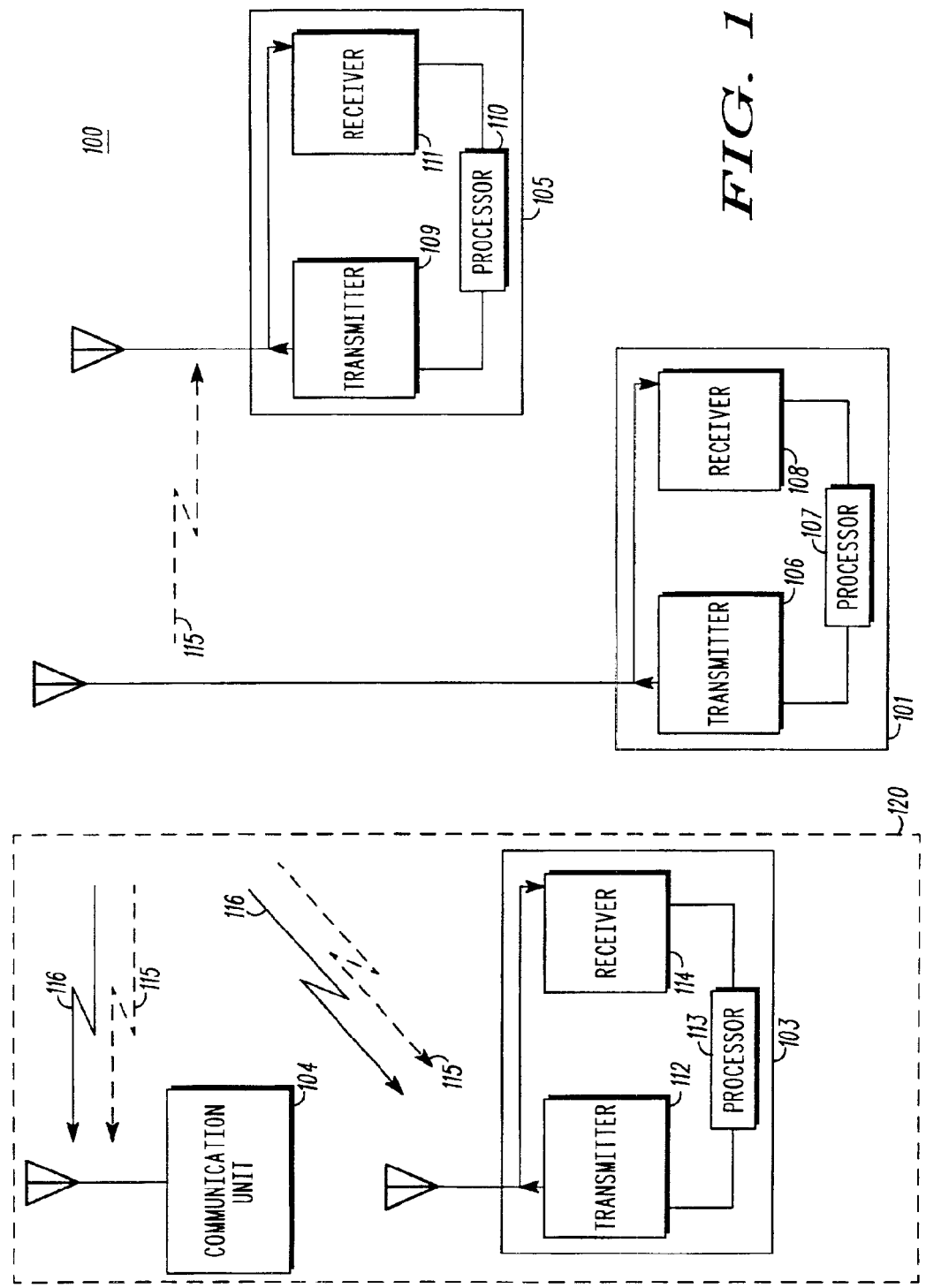
FIG. 1 is a block diagram depiction of a CDMA communication system in accordance with a preferred embodiment of the present invention.

In general, the present invention discloses a method and an apparatus that provide a dispatch patch service in a CDMA communication system. A communication unit involved in a dispatch call requests a base site to patch a patch target, either a dispatch group or an individual, into the present call. By providing the CDMA long-code mask being used for the present call to the patch target and the dispatch identifier of the patch target to at least the communication unit, a new CDMA long-code mask can be generated and used for the dispatch call going forward.

The present invention encompasses a method for providing a dispatch patch service to a communication unit in a CDMA communication system. This method comprises encoding dispatch communication for a dispatch call using a first CDMA long-code mask and receiving a request to patch a dispatch target into the dispatch call from the communication unit, where prior to the step of receiving the dispatch call does not involve the dispatch target and the first CDMA long-code mask is used for encoding dispatch communication for the dispatch call. This method also comprises transmitting a channel assignment to the dispatch target that indicates the first CDMA long-code mask.

The present invention further encompasses a method to invoke a dispatch patch service from a base site in a CDMA communication system. In this method, a communication unit decodes dispatch communication for a dispatch call using a CDMA long-code mask and transmits a request to patch a dispatch target into the dispatch call, where the dispatch call does not involve the dispatch target prior to transmitting. The communication unit also receives CDMA long-code mask update information and decodes dispatch communication for the dispatch call using an updated CDMA long-code mask, wherein the dispatch call involves at least the communication unit and the dispatch target.

Additionally, the present invention encompasses a method for a communication unit to be patched into a dispatch call in a CDMA communication system. In this method, the communication unit receives a dispatch page for the dispatch call and a channel assignment that indicates a first CDMA long-code mask used for the dispatch call. The communication unit also generates a second CDMA long-code mask using the first CDMA long-code mask and a dispatch identifier of the communication unit and decodes dispatch communication for the dispatch call using the second CDMA long-code mask.

The present invention also encompasses an apparatus for a base site. This base site comprises a processor capable of encoding dispatch communication for a dispatch call using a first CDMA long-code mask and a a receiver capable of receiving a request to patch a dispatch target into the dispatch call from a communication unit, where prior to the receiver receiving the request, the dispatch call does not involve the dispatch target and the first CDMA long-code mask is used for encoding dispatch communication for the dispatch call. The base site also comprises a transmitter capable of transmitting, when instructed to transmit by the processor, a channel assignment to the dispatch target that indicates the first CDMA long-code mask.

The present invention also encompasses an apparatus for a communication unit. This communication unit comprises a processor capable of decoding dispatch communication for a dispatch call using a CDMA long-code mask, capable of instructing the transmitter to transmit a request to patch a dispatch target into the dispatch call, and capable of decoding, subsequent to instructing the transmitter to transmit the request to patch, dispatch communication for the dispatch call using an updated CDMA long-code mask for the dispatch call. This communication unit also comprises a transmitter capable of transmitting the request to patch and a receiver capable of receiving CDMA long-code mask update information used to generate the updated CDMA long-code mask.

Furthermore, the present invention encompasses another apparatus for a communication unit. This communication unit comprises a receiver capable of receiving a dispatch page for a dispatch call and a channel assignment that indicates a first CDMA long-code mask used for the dispatch call. This communication unit also comprises a processor capable of generating a second CDMA long-code mask using the first CDMA long-code mask and a dispatch identifier of the communication unit and capable of decoding dispatch communication for the dispatch call using the second CDMA long-code mask.

The present invention can be more fully understood with reference to FIGS. 1–4. FIG. 1 is a block diagram depiction of a CDMA communication system 100 in accordance with a preferred embodiment of the present invention. Preferably, the CDMA communication system 100 is a system in accordance with the well-known Telecommunications Industry Association/Electronic Industries Association Standard 95 (TIA/EIA IS-95-B) modified as described below to implement the present invention and modified as described in co-pending application "METHOD AND APPARATUS FOR PROVIDING DISPATCH SERVICE IN A CDMA COMMUNICATION SYSTEM" to provide dispatch group and individual service. CDMA communication system 100 could alternatively be based upon the TIA/EIA IS-2000 (CDMA 2000) standard rather than IS-95.

CDMA communication system 100 comprises fixed network equipment and mobile communication units. The fixed network equipment includes a base site 101 that is preferably networked to other base sites, controllers, and switches, all part of the fixed network equipment of system 100 and all well known to those skilled in the art. For simplicity, only base site 101 of the fixed network equipment is shown in FIG. 1. Again for simplicity, only three of what could be thousands of mobile communication units are shown in FIG. 1. Communication units 103–105 each preferably comprise CDMA-capable wireless phones. They communicate with base site 101 via a CDMA air interface that comprises coded-channel communication resources 115 and 116. In an alternative embodiment, however, the communication units could comprise any communication device capable of communicating via a CDMA air interface.

Each of the communication units 103–105 comprises a common set of elements, a transmitter, a receiver, and a processor. In particular, processor 110 and processor 113, each typically comprise one or more processing devices (e.g., microprocessors, digital signal processors, etc.) and memory devices, are coupled to transmitter 109 and transmitter 112, respectively, and coupled to receiver 111 and receiver 114, respectively. Each of these elements is well-known in the art. In the preferred embodiment, under the control of software algorithms stored in the memory devices of processor 110 and in cooperation with the other elements shown, the processor 110 performs those tasks required for operation of communication unit 105, including the method described relative to FIG. 4. Similarly, in the preferred embodiment, under the control of software algorithms stored in the memory devices of processor 113 and in cooperation with the other elements shown, the processor 113 performs those tasks required for operation of the communication unit 103, including the method described relative to FIG. 3.

Base site 101 also comprises elements well-known in the art, a transmitter 106, a receiver 108, and a processor 107. Coupled to transmitter 106 and receiver 108, processor 107 preferably comprises memory devices and processing devices such as a microprocessor and digital signal processor. In the preferred embodiment, under the control of software algorithms stored in the memory devices of processor 107 and in cooperation with the other elements shown, the processor 107 performs those tasks required for operation of the base site, including the method described relative to FIG. 2.

Operation of the preferred CDMA communication system 100, in accordance with the present invention, occurs substantially as follows. Communication units 103 and 104 are, for the purpose of illustration, logically arranged into a dispatch group (or talkgroup) 120 that is involved in a dispatch group call supported by base site 101. Preferably, processor 107 is encoding dispatch communication for the dispatch call using a first CDMA long-code mask, and transmitter 106 is transmitting this encoded communication to the communication units 103 and 104 via coded-channel communication resource 116. Communication units 103 and 104, but not communication unit 105, decode this dispatch communication using the first CDMA long-code mask. To simplify illustration, the dispatch communication is not originated by any of the communication units or base site of FIG. 1. Instead, it is assumed that another member of dispatch group 120 at another base site (not shown) is originating the dispatch communication, i.e., it is the member talking to the rest of the group.

Wanting to patch communication unit 105 into the present dispatch call, the user of communication unit 103 makes the required keystrokes to communication unit 103. Processor 113 preferably generates a modified IS-95/CDMA 2000 ORDER message containing a patch_new_target value for the ORDER QUALIFICATION CODE and the dispatch identifier of communication unit 105 in the ORDER SPECIAL FIELDS. Processor 113 then instructs transmitter 112 to transmit this request to patch dispatch target 105 into the dispatch call. Receiver 108 receives the request, and processor 107 preferably generates a modified IS-95/CDMA 2000 GENERAL PAGE message in which the PAGE CLASS field contains "11", the SPECIAL SERVICE flag is set, the SERVICE OPTION field contains a value indicating dispatch, and the mobile subscriber identifier contains the dispatch identifier of communication unit 105. This page message is transmitted by base site 101 and received by receiver 111. In the preferred embodiment, communication unit 105 responds with an enhanced PAGE RESPONSE message in which the SPECIAL SERVICE flag is set and the SERVICE OPTION field contains a value indicating dispatch.

Processor 107 generates a modified IS-95/CDMA 2000 CHANNEL ASSIGNMENT and instructs transmitter 106 to transmit it to communication unit 105. Received by receiver 111, this modified CHANNEL ASSIGNMENT preferably indicates both the traffic channel and the first CDMA long-code mask being used for the dispatch call. Processor 107 also preferably generates a modified IS-95/CDMA 2000 ORDER message in which the ORDER field contains the long_code_transition value, the ORDQ field contains the dispatch_mask_switchover value, the TARGET_ID field contains the dispatch target identifier for communication unit 105, and the TARGET_NAME field contains any alias information by which communication unit 105 is identified to the other call members. Processor 107 instructs transmitter 106 to transmit the modified CHANNEL. ASSIGNMENT and modified ORDER message, each with its CDMA long-code mask update information, to communication unit 105 (the CHANNEL ASSIGNMENT) and communication units 103 and 104 (the ORDER message).

Thus, the receivers of communication units 103–105 receive CDMA long-code mask update information by one of two messages, and thereby, each communication unit has the first CDMA long-code mask and the dispatch identifier of communication unit 105. The processors of communication units 103–105 and base site 101 generate a second CDMA long-code mask using the first CDMA long-code mask and the dispatch identifier of communication unit 105. Preferably, communication devices 101, and 103–105 generate this second CDMA long-code mask using a pre-defined algorithm known to each, such as simply exclusive ORing the first CDMA long-code mask and the dispatch identifier of communication unit 105. Processor 107 now begins to encode dispatch communication for the continuing dispatch call using this second CDMA long-code mask. Finally, communication units 103–105 receive the encoded dispatch communication via coded-channel communication resource 115 and decode it using the second CDMA long-code mask. Thus, this preferred embodiment effectively patches communication unit 105 into the dispatch call already in progress.

Although the description above describes patching an individual communication unit into a group dispatch call. The present invention is not limited to such a scenario. Rather, the dispatch call could have been a dispatch individual call between communication units 103 and 104 or the dispatch target (communication unit 105 above) could have been an entire dispatch group that was being patched into the existing dispatch call. In other words, the dispatch identifier of the dispatch target that is being patched can identify either a dispatch group or a dispatch individual; the present invention encompasses both.

Also, the present invention does not limit the number of different dispatch targets that can be patched into an existing dispatch call. For example, a dispatch individual may be patched first, followed by a dispatch group second, followed by a dispatch individual third, and so on. Each time a new dispatch target is patched into the call, the new long-code mask is generated based on the mask being used and the dispatch identifier of the new dispatch target. Thus, the present invention enables a flexible dispatch patch service for a CDMA communication system, and the preferred embodiment disclosed provides the service with minimal deviations from the IS-95 and CDMA 2000 standards.

Figure 2:
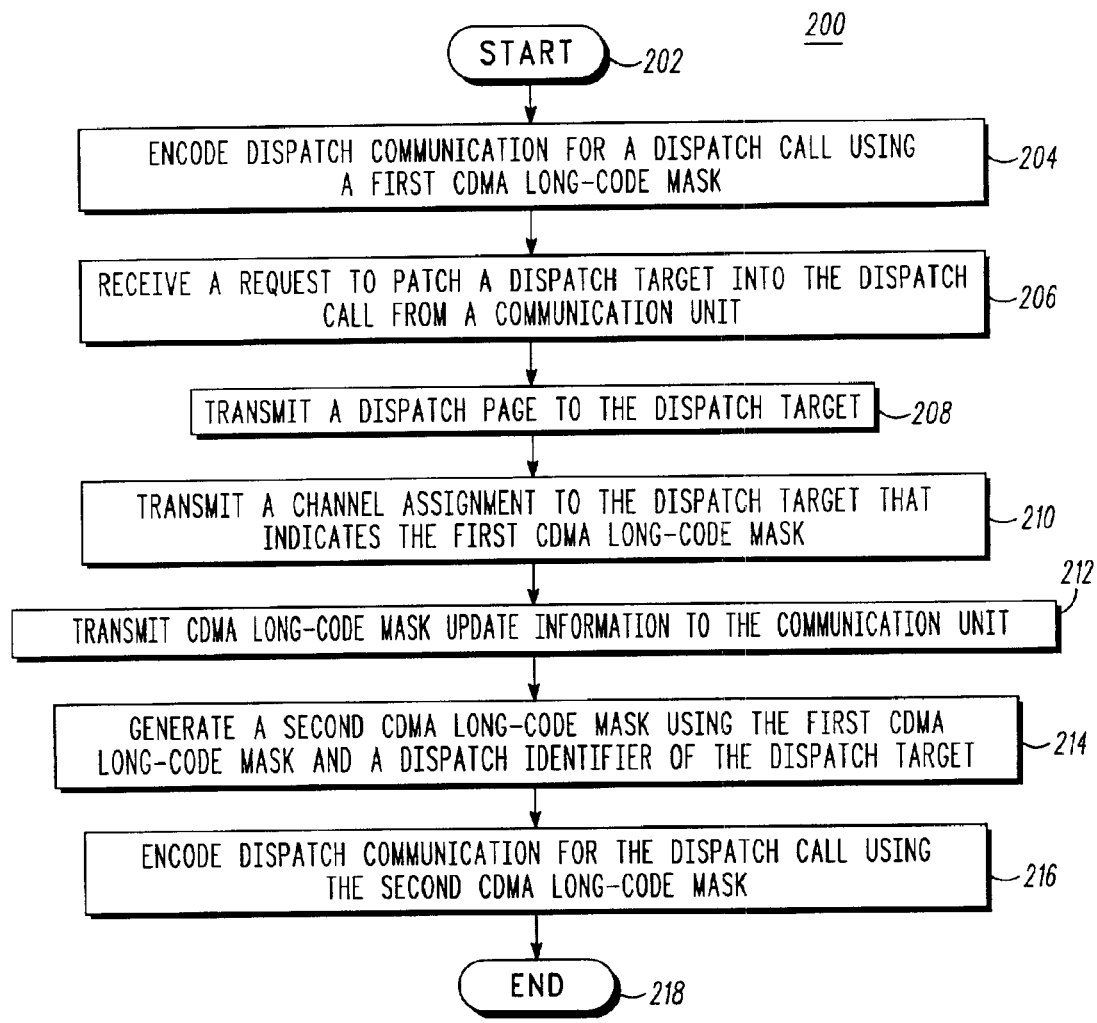
FIG. 2 is a logic flow diagram of steps executed by a base site in accordance with a preferred embodiment of the present invention.

FIG. 2 is a logic flow diagram 200 of steps executed by a base site in accordance with a preferred embodiment of the present invention. The logic flow begins (202) with a dispatch call already in progress, and the base site encoding (204) dispatch communication for the dispatch call using a first CDMA long-code mask. The dispatch call may be either a group dispatch call between the members of a dispatch group or an individual dispatch call between two dispatch individuals.

Sometime during the call, the base site receives (206), from a communication unit in the call, a request to patch a dispatch target into the call. This dispatch target may be either a dispatch group or a dispatch individual that is not presently part of the dispatch call. The base site preferably transmits a dispatch page (208) and a channel assignment (210) to the dispatch target. The preferred channel assignment indicates both the first CDMA long-code mask and the traffic channel presently being used by the dispatch call. To the requesting communication unit and the other units involved in the dispatch call, the base site preferably transmits (212) CDMA long-code mask update information, thereby ordering the communication units to update the CDMA long-code mask that they are using for this call.

In the preferred embodiment, the base site then generates (214) a second CDMA long-code mask using the first CDMA long-code mask and the dispatch identifier of the dispatch target. The structure of a preferred dispatch identifier is described in the co-pending application, "METHOD AND APPARATUS FOR PROVIDING DISPATCH SERVICE IN A CDMA COMMUNICATION SYSTEM." In general, the dispatch identifier of the dispatch target may contain either or both a dispatch group identifier or a dispatch individual identifier of the dispatch target. Finally, the base site preferably begins encoding (216) dispatch communication for the dispatch call using the second CDMA long-code mask, and the logic flow ends (218).

Figure 3:
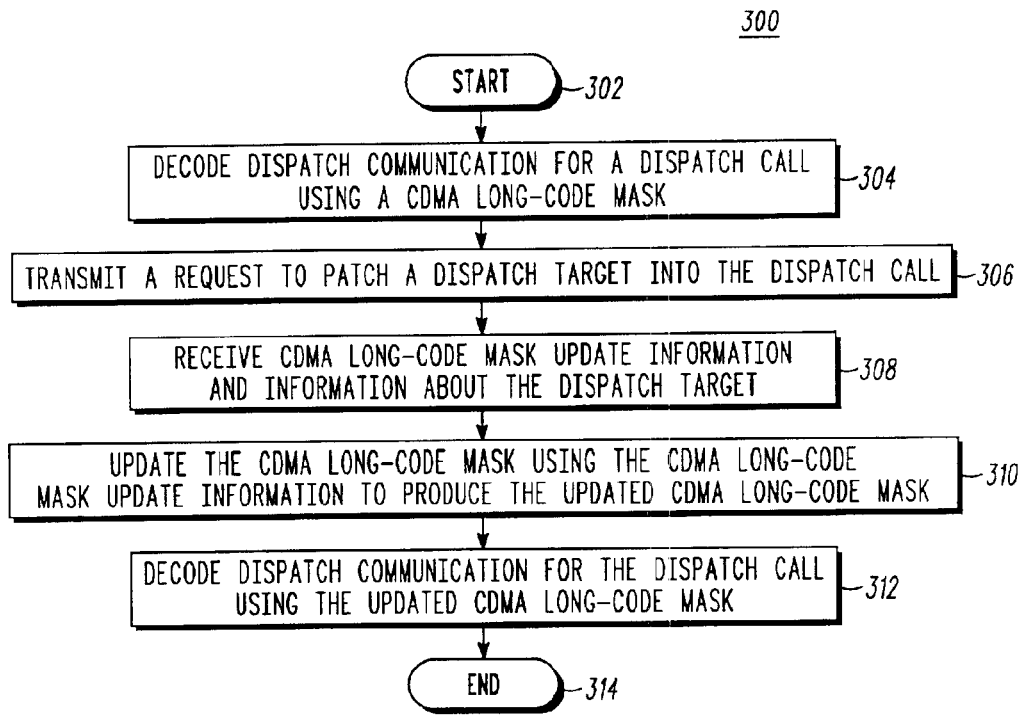
FIG. 3 is a logic flow diagram of steps executed by a communication unit to invoke a dispatch patch service in accordance with a preferred embodiment of the present invention.

FIG. 3 is a logic flow diagram 300 of steps executed by a communication unit to invoke a dispatch patch service in accordance with a preferred embodiment of the present invention. The logic flow begins (302) with a dispatch call already in progress and the communication unit decoding (304) dispatch communication for the dispatch call using a CDMA long-code mask. The communication unit transmits (306) a request to patch a dispatch target, not yet involved in the dispatch call, into the dispatch call. The communication unit then receives (308) CDMA long-code mask update information. Preferably, this update information contains the dispatch identifier of the dispatch target and other information about the dispatch target such as alias information.

In the preferred embodiment, the communication unit then updates (310) the CDMA long-code mask, using the CDMA long-code mask update information, to produce an updated CDMA long-code mask. This update preferably involves computing a new long-code mask using the dispatch identifier of the dispatch target and the CDMA long-code mask being used for the call. Alternatively, however, the CDMA long-code mask update information may contain the updated CDMA long-code mask itself and, thus, no computing would be necessary. However, because transmitting the new mask directly is less secure than independently computing it, the computation is preferable. Finally, the communication unit begins decoding (312) dispatch communication for the dispatch call, which now includes the dispatch target, using the updated CDMA long-code mask, and the logic flow ends (314).

Figure 4:
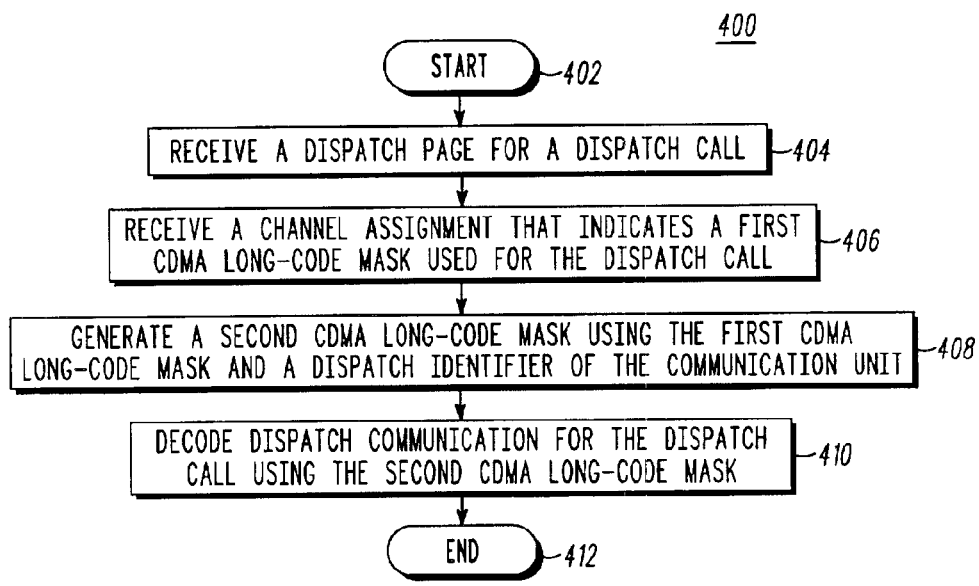
FIG. 4 is a logic flow diagram of steps executed by a communication unit being patched into a dispatch call in accordance with a preferred embodiment of the present invention.

FIG. 4 is a logic flow diagram 400 of steps executed by a communication unit being patched into a dispatch call in accordance with a preferred embodiment of the present invention. The logic flow begins (402) when this communication unit receives (404) a dispatch page for the dispatch call already in progress. The communication unit then receives (406) a channel assignment that indicates a first CDMA long-code mask. This is the long-code mask that the dispatch call was using when communication unit received the dispatch page. The communication unit then generates a second CDMA long-code mask using the first CDMA long-code mask and its dispatch identifier. Finally, the communication unit joins the dispatch call in-progress by beginning to decode dispatch communication for the call using the second CDMA long-code mask, and the logic flow ends (412).

The descriptions of the invention, the specific details, and the drawings mentioned above, are not meant to limit the scope of the present invention. It is the intent of the inventors that various modifications can be made to the present invention without varying from the spirit and scope of the invention, and it is intended that all such modifications come within the scope of the following claims and their equivalents.

What is claimed is:

1. A method for a base site to provide a dispatch patch service to a communication unit in a CDMA communication system, the method comprising the steps of:

encoding dispatch communication for a dispatch call using a first CDMA long-code mask;

receiving a request to patch a dispatch target into the dispatch call from the communication unit, wherein, prior to the step of receiving, the dispatch call does not involve the dispatch target and the first CDMA long-code mask is used for encoding dispatch communication for the dispatch call; and transmitting a channel assignment to the dispatch target that indicates the first CDMA long-code mask;

transmitting CDMA long-code mask update information to the communication unit;

generating a second CDMA long-code mask using the first CDMA long-code mask and a dispatch identifier of the dispatch target; and encoding dispatch communication for the dispatch call using the second CDMA long-code mask.

2. The method of claim 1 further comprising the step of transmitting a dispatch page to the dispatch target.

3. The method of claim 1 wherein the dispatch call is a group dispatch call.

4. The method of claim 1 wherein the dispatch call is an individual dispatch call.

5. The method of claim 1 wherein the dispatch target is a dispatch group.

6. The method of claim 1 wherein the dispatch target is a dispatch individual.

7. The method of claim 1 wherein the dispatch identifier of the dispatch target comprises a dispatch group identifier of the dispatch group associated with the dispatch target.

8. The method of claim 1 wherein the dispatch identifier of the dispatch target comprises a dispatch individual identifier of the dispatch target.

9. The method of claim 1 wherein the channel assignment indicates a traffic channel associated with the dispatch call prior to the step of receiving.

10. A method for a communication unit to invoke a dispatch patch service from a base site in a CDMA communication system, the method comprising the steps of:

decoding, by the communication unit, dispatch communication for a dispatch call using a CDMA long-code mask;

transmitting, by the communication unit, a request to patch a dispatch target into the dispatch call, wherein the dispatch call does not involve the dispatch target prior to the step of transmitting;

receiving, by the communication unit, CDMA long-code mask update information; and decoding, by the communication unit subsequent to the step of transmitting, dispatch communication for the dispatch call using an updated CDMA long-code mask, wherein the dispatch call involves at least the communication unit and the dispatch target.

11. The method of claims 10 wherein the CDMA long-code mask update information is the updated CDMA long-code mask.

12. The method of claim 10 further comprising the step of updating the CDMA long-code mask using the CDMA long-code mask update information to produce the updated CDMA long-code mask.

13. The method of claim 12 wherein the CDMA long-code mask update information comprises a dispatch identifier of the dispatch target.

14. The method of claim 10 further comprising the step of receiving, by the communication unit, information about the dispatch target.

15. A method for a communication unit to be patched into a dispatch call in a CDMA communication system, the method comprising the steps of:

receiving, by the communication unit, a dispatch page for the dispatch call;

receiving, by the communication unit, a channel assignment that indicates a first CDMA long-code mask used for the dispatch call prior to the step of receiving the dispatch page;

generating, by the communication unit, a second CDMA long-code mask using the first CDMA long-code mask and a dispatch identifier of the communication unit; and decoding, by the communication unit, dispatch communication for the dispatch call using the second CDMA long-code mask.

16. The method of claim 15 wherein the dispatch identifier of the communication unit comprises a dispatch group identifier of the dispatch group associated with the communication unit.

17. The method of claim 15 wherein the dispatch identifier of the communication unit comprises a dispatch individual identifier of the communication unit.

18. A base site comprising:

a processor capable of encoding dispatch communication for a dispatch call using a first CDMA long-code mask;

a receiver capable of receiving a request to patch a dispatch target into the dispatch call from a communication unit, wherein, prior to the receiver receiving the request, the dispatch call does not involve the dispatch target and the first CDMA long-code mask is used for encoding dispatch communication for the dispatch call; and a transmitter capable of transmitting, when instructed to transmit by the processor, a channel assignment to the dispatch target that indicates the first CDMA long-code mask, wherein the transmitter is further capable of transmitting CDMA long-code mask update information to the communication unit when instructed to by the processor and wherein the processor is further capable of generating a second CDMA long-code mask using the first CDMA long-code mask and a dispatch identifier of the dispatch target and capable of encoding dispatch communication for the dispatch call using the second CDMA long-code mask.

19. A communication unit comprising:

a processor capable of decoding dispatch communication for a dispatch call using a CDMA long-code mask, capable of instructing the transmitter to transmit a request to patch a dispatch target into the dispatch call, wherein the dispatch call does not involve the dispatch target prior to instructing the transmitter to transmit the request to patch, and capable of decoding, subsequent to instructing the transmitter to transmit the request to patch, dispatch communication for the dispatch call using an updated CDMA long-code mask for the dispatch call, wherein the dispatch call involves at least the communication unit and the dispatch target;

a transmitter capable of transmitting the request to patch; and a receiver capable of receiving CDMA long-code mask update information used to generate the updated CDMA long-code mask.

20. A communication unit comprising:

a receiver capable of receiving a dispatch page for a dispatch call and a channel assignment that indicates a first CDMA long-code mask used for the dispatch call; and a processor capable of generating a second CDMA long-code mask using the first CDMA long-code mask and a dispatch identifier of the communication unit and capable of decoding dispatch communication for the dispatch call using the second CDMA long-code mask.

* * * * *